May 26, 1936.   L. K. SILLCOX   2,041,872

FLUID PRESSURE BRAKE

Filed Jan. 21, 1935

Inventor
Lewis K. Sillcox

By
Attorneys

Patented May 26, 1936

2,041,872

UNITED STATES PATENT OFFICE 2,041,872

FLUID PRESSURE BRAKE

Lewis K. Sillcox, Watertown, N. Y., assignor to The New York Air Brake Company, a corporation of New Jersey Application January 21, 1935, Serial No. 2,821

11 Claims. (Cl. 188—87)

This invention relates to fluid pressure brakes, and particularly to brakes for high speed trains of the modern streamlined type.

In the operation of high speed trains, a major problem is to attain stopping distances short enough to be safe, particularly stopping distances short enough to be safe on tracks equipped with block systems spaced according to standards adopted on the basis of present operating conditions. It is impracticable to secure with wheel brakes stopping distances as short as are known to be desirable under emergency conditions.

In a prior application, Serial No. 718,268, filed March 30, 1934, I describe and claim a wind resistance brake intended to be used as an adjunct to pneumatic wheel brakes and arranged to come into action under emergency conditions, that is when cylinder pressures are high. With such an arrangement the wind brake is used only under emergency conditions because the brake cylinder pressures are high only under such conditions.

Another operative characteristic of such a brake is that since the brake cylinder pressure is reduced as the train approaches the state of rest, the wind brake will return to an inactive position when the train speed has been reduced below a chosen value, the wind resistance brake being ineffective except at high train speeds.

An important characteristic of any wind resistance brake is that the wind resistance element or elements must be wholly within the clearance limits of the road over which the train is operated. Furthermore, it is highly desirable that the wind resistance structure be housed within the transverse dimensional limits of the train.

The present invention provides what might be described as a vented parachute supported on the rear end of the train and shiftable between two positions relatively to the rear end of the train. The normal position is one in which the wind resistance element conforms to and in effect forms a part of the streamlined envelope of the rear portion of the train. The second or abnormal position involves the displacement of this member to the rear thus converting it into a sort of wind scoop or parachute preferably provided with a central vent. As well known, this form is conducive to high wind resistance. Structurally the form is desirable because it is inherently stable or approximately so, thus permitting the light construction suited to this class of train.

In disclosing the invention a more or less diagrammatic showing has been adopted, and details of bracing and like features have not been elaborately shown. So far as the invention is concerned these may follow known engineering principles but to illustrate them would result in undue complication of the drawing. Furthermore the location of portions of the apparatus and the scale thereof have been modified slightly to increase their visibility and simplify the presentation of the case.

Referring to the drawing,—

Figure 1:
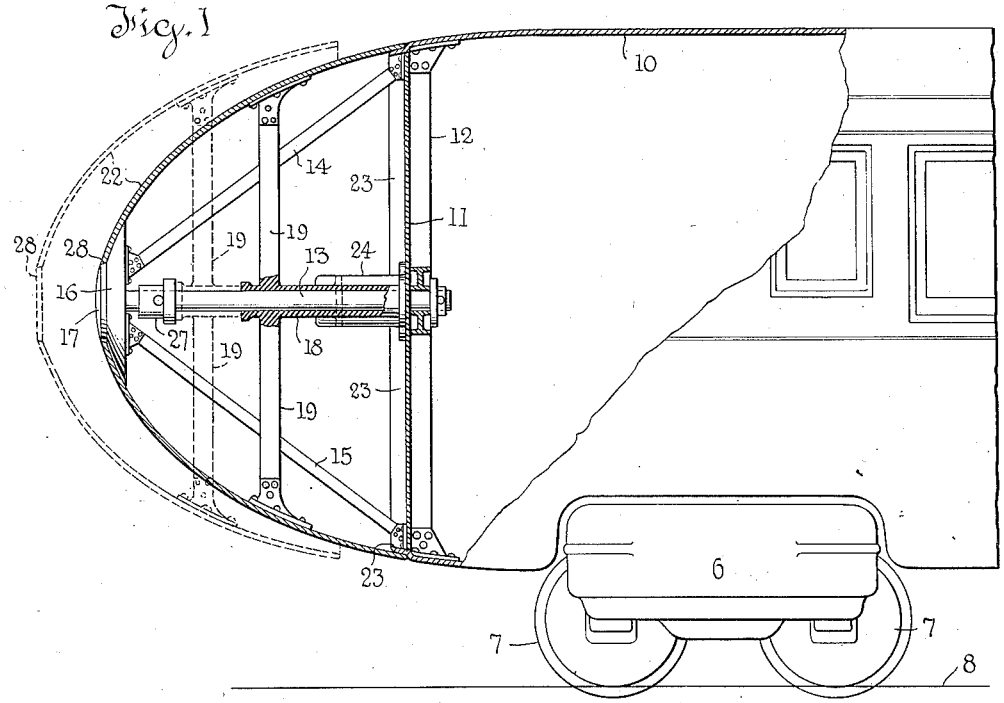
Fig. 1 is a view partly in side elevation and partly in vertical axial section of the rear end of a streamlined car. Where this car is used in a train it would be the last car.

The rear truck is indicated generally by the reference numeral 6 and is provided with wheels 7 running on a track 8. The wheels 7 are supposed to be provided with wheel brakes, not shown, and these brakes are actuated by brake cylinders 9 indicated in Fig. 2. While wheel brakes are specifically mentioned, these are intended to be typical of any friction brake which might be used on such a train, whether the brake shoes work directly on the wheels or on some other element affording a frictional retardation of the train with respect to the track 8. The body of the car is generally indicated at 10, and may be of any preferred construction. It terminates in a bulk-head 11 suitably strengthened by any conventional means indicated generally by the beams 12. Mounted on the bulkhead 11 and beam 12 is a rearwardly extending guide rod 13 which is braced at its outer end by the diagonal members 14 and 15, intended to be typical of any suitable bracing mechanism.

Carried by the rear end of the guide member 13 is a head 16 formed with a boss 17, the boss being formed to serve as the terminal portion of the streamline of the car as a whole. Slidable on the member 13 in fore and aft direction with reference to the car is a sleeve 18 which carries a spider or frame indicated by the numerals 19 and 21, and serves to support a cup-shaped annular shell 22. In the normal position of the shell, shown in Fig. 2 and in full lines in Fig. 1, the forward margin of the shell 22 laps over a seating flange 23 adjacent partition 11. The rear end of the shell 22 is apertured to encircle the boss 17 on the head 16 so that when the member 22 is in its normal forward position the car body 10, shell 22 and boss 17 offer a continuous streamline surface of suitable form.

As opinions differ on the question of what is the best streamline form, the form shown in the drawing is intended to be typical and not limiting, for obviously the member 22 can be formed to meet any of the various conflicting views on this subject.

Mounted on the bulkhead 11 are two cylinders 24 in which pistons 25 may reciprocate. These pistons are connected by rods 26 to the cross member 21 above described, so that when the pistons 25 are forced to the rear they shift the member 22 to the rear, rearward motion being limited by a stop 27 on the guide 13. When so shifted the member 22 assumes the dotted line position of Fig. 1 in which it serves as a wind scoop vented at its center by means of the aperture 28. In this position the shell 22 serves as a highly efficient device for developing wind resistance in opposition to the forward motion of the vehicle, and the vent at 28 is an important contributing factor to the desired result. It will also be observed that the general configuration of the member 22 is favorable to inherent stability so that elaborate bracing of the member 22 is unnecessary.

The two pistons 25 in the cylinders 24 are moved in harmony with each other by a single valve mechanism of the balanced piston type, enclosed in the valve housing 31. Pressure fluid is supplied through the pipe 32 to the valve housing 31 from any suitable source. Preferably the pressure fluid is a compressible gas rather than a liquid, and conveniently may be derived from a pipe or reservoir forming part of the brake system. The particular source of such pressure fluid is not a feature of the invention.

The piston valve 33 which works in the housing has two positions. In the normal position shown in the drawing it connects the head ends of the cylinders 24 to atmosphere and admits pressure fluid to the opposite ends of the cylinders, thus causing the pistons to move toward the head ends of the cylinders and hold the member 22 in the normal or full line position shown in the drawing. If the valve member 33 be shifted to the right, as viewed in the drawing, pressure fluid will be admitted to the head ends of the cylinders 24 and exhausted from the opposite ends so that the pistons 25 shift rearwardly and move the member 22 to the dotted line position of Fig. 1. The valve conforms to known practice and the porting is clearly shown in the drawing so that an elaborate description of the valve is unnecessary.

In each exhaust port of the valve are mounted adjustable valve members 34 and 35, the purpose being to throttle the exhaust port and thus develop a retarding or cushioning pressure on the exhaust side of the piston which will cushion the movement of the member 22 as it approaches each limit of motion.

It will be observed that the valve 35 controls exhaust from the rear ends of the cylinders 24 and it is contemplated that the valve 35 will be set to exercise a very pronounced throttling action. The reason for this is that as soon as the member 22 starts in a rearward direction it will be subjected to heavy forces tending to carry it to its limit of motion, and the throttling of the exhaust from the rear ends of the cylinders 24 will serve to retard and cushion this action, thus avoiding severe shocks between the sleeve 18 and the stop 27. The throttling action of the valve 34 is of relatively minor importance but this cushioning action as the member 22 moves forward and approaches its normal position, is considered highly desirable.

The pipe 36 is the pipe through which air is supplied from any suitable source to the brake cylinders 9. The source may be any known air brake system, and since such systems are well known and vary widely in their details, it is deemed unnecessary to elaborate this feature, the pipe 36 being typical of any source of braking pressure.

A pipe 37 leads from the cylinders 9 to the cylinder 38 of a pressure motor arranged to shift the valve 33. This motor includes a piston 39 which may be shifted in cylinder 38 against the resistance of a loading spring 41. The pressure admitted through pipe 37 acts on piston 39 in opposition to the loading spring, and the strength of the loading spring 41 is such that when the intensity of brake cylinder pressure is above a chosen value, and not otherwise, the piston 39 will move to the rear. Between the piston 39 and the valve 34 is interposed a quick throw mechanism including a sleeve 42 in which is housed a contractile annular spring 43. The spring 43 encircles a double conical head 44 on a rod connected with the valve 33. When the piston 39 is in the position shown in Fig. 2 the spring 43 urges the valve 33 to its normal or left hand position. When the piston 39 starts to the rear as the result of increasing brake cylinder pressure, the first effect will be to force the valve 33 to the rear, but when the spring 43 passes over the enlarged middle circumference of the head 44 the action will be suddenly reversed and the valve 33 will snap forward, thus reversing the pressure connections on the cylinders 24 and causing the member 22 to be moved to the dotted line position of Fig. 1. As brake cylinder pressure falls below the chosen value determined by the strength of the spring 41, the quick throw action will be reversed. Consequently the valve 33 will snap back to the normal position shown in Fig. 2. This again reverses the pressure connections on the cylinders 24 so that member 22 is returned to the normal or full line position shown in the drawing. The throttling of the exhaust connection will produce the desired cushioning effect as the member 22 approaches each limit of motion and this throttling effect can readily be made much more severe as to rearward motion than as to forward motion by so adjusting valve 35 that it has a greater throttling effect than the valve 34.

Figure 2:
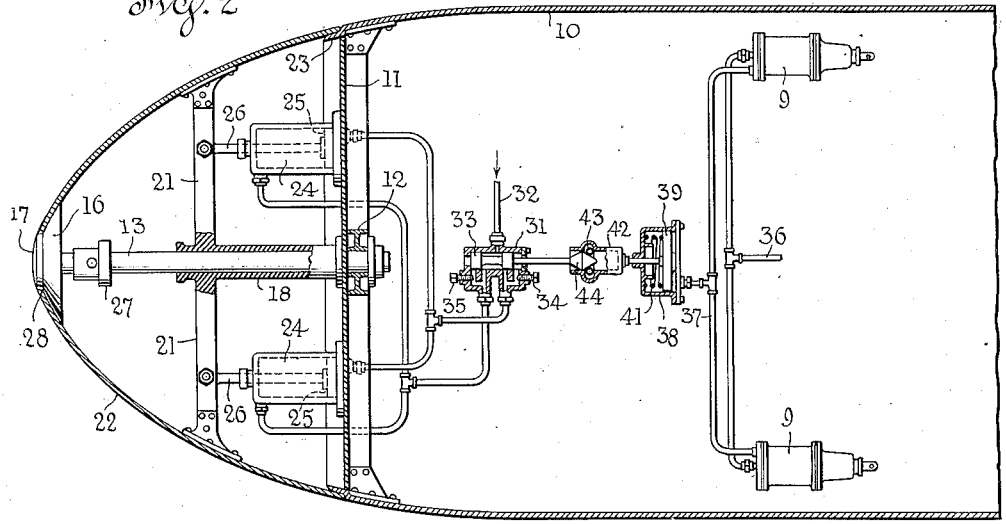
Fig. 2 is a horizontal section, the wheel brake cylinders and the control valve mechanism for the wind brake being diagrammatically illustrated so far as their position and scale are concerned.

The valve mechanism and the housing 31, the motor including the cylinder 38, and the quick throw mechanism housed in sleeve 42, may obviously be variously located and ordinarily would be closely associated with the cylinders 24. In Fig. 2 they are shown on a somewhat larger scale than would actually be used in practice, the purpose being to illustrate the principle of the invention rather than the precise location of these parts. Such location is a mere matter of design.

What is claimed is,—

1. The combination of a vehicle body and a stream-lined end extension thereof, said extension being bodily shiftable on the vehicle by translatory motion in the general direction of travel of the vehicle, between two positions, in one of which the body and extension conjointly present a streamlined exterior, and in the other of which the extension serves as a wind resistance brake.

2. The combination of a vehicle body and a streamlined end extension thereof, said extension being bodily shiftable on the vehicle in the general direction of travel of the vehicle, between two positions, in one of which the body and extension conjointly present a streamlined exterior, and in the other of which the extension serves as a wind resistance brake, said extension being formed with at least one vent port arranged to be opened by motion of the extension to the second-named position.

3. The combination of a vehicle having a streamlined form; an annular member normally positioned to conform to the streamlines of the exterior of said vehicle; and means for shifting said member in the direction of travel of said vehicle to serve as wind resistance retarding means for said vehicle.

4. The combination of a vehicle, streamlined at its rear end; an annular member carried by said vehicle and normally positioned to conform to the stream lines of the rear end of said vehicle; and means for shifting said member rearwardly to a position in which it serves as a vented wind brake.

5. The combination of a vehicle body, a support projecting from an end of said vehicle; and an annular shell shiftable on said support substantially in the direction of travel of the vehicle, said shell in one position coacting with the vehicle body and the end of said support to provide a streamlined end for the body, and serving in another position as a centrally vented wind resistance brake.

6. The combination of a vehicle, streamlined at its rear end; a member carried by said vehicle and normally positioned to conform to the stream lines of the rear end of the vehicle; means for guiding said member rearwardly relatively to the general direction of vehicle travel to a position in which it serves as a wind brake; fluid pressure motor means for shifting said member between said positions; and means for cushioning the shifting of said motor and member in said rearward motion comprising throttling means controlling an exhaust flow from the motor.

7. The combination of a vehicle; a guide mounted on the rear end thereof and extending in the general direction of the length of the vehicle; and a cup-like centrally vented member shiftable on said guide between two positions, in one of which it forms a continuation of the exterior surface of the vehicle, and in the other of which it serves as a centrally vented wind scoop for retarding forward motion of the vehicle.

8. The combination of a vehicle; a guide mounted on the rear end thereof and extending in the general direction of the length of the vehicle; a cup-like centrally vented member shiftable on said guide between two positions, in one of which it forms a continuation of the exterior surface of the vehicle, and in the other of which it serves as a centrally vented wind scoop for retarding forward motion of the vehicle; and motor means for shifting said member housed within said member.

9. The combination of a vehicle; a guide mounted on the rear end thereof and extending in the general direction of the length of the vehicle; a cup-like centrally vented member shiftable on said guide between two positions, in one of which it forms a continuation of the exterior surface of the vehicle, and in the other of which it serves as a centrally vented wind scoop for retarding forward motion of the vehicle; and fluid pressure motor means housed within said member and operable to shift the same, said motor means including cushioning means effective near at least one of the limits of motion of said member.

10. The combination with a vehicle, of a wind brake element shiftably mounted thereon and arranged to be drawn toward its active position by the braking force which it develops; reversible fluid pressure motor means operative through reversal to hold said element in its inactive position, or to shift the element toward active position; and means for throttling the exhaust of said motor whereby motion of said element to active position is retarded.

11. The combination with a vehicle, of a wind brake element shiftably mounted thereon and arranged to be drawn toward its active position by the braking force which it develops; reversible motor means operative through reversal to hold said element in its inactive position, or to shift the element toward active position and then retard its motion to active position; a fluid pressure brake cylinder; and means responsive to variations of pressure in said brake cylinder past a chosen value, and serving to reverse said motor.

LEWIS K. SILLCOX.